US011908481B2

(12) United States Patent
Xing et al.

(10) Patent No.: US 11,908,481 B2
(45) Date of Patent: Feb. 20, 2024

(54) METHOD FOR ENCODING LIVE-STREAMING DATA AND ENCODING DEVICE

(71) Applicant: BEIJING DAJIA INTERNET INFORMATION TECHNOLOGY CO., LTD., Beijing (CN)

(72) Inventors: Wenhao Xing, Beijing (CN); Chen Zhang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 271 days.

(21) Appl. No.: 17/582,778

(22) Filed: Jan. 24, 2022

(65) Prior Publication Data
US 2022/0148603 A1 May 12, 2022

Related U.S. Application Data

(63) Continuation of application No. PCT/CN2021/075612, filed on Feb. 5, 2021.

(30) Foreign Application Priority Data

Feb. 18, 2020 (CN) .......................... 202010099025.7

(51) Int. Cl.
*G10L 19/005* (2013.01)
*H04L 65/70* (2022.01)
(Continued)

(52) U.S. Cl.
CPC ........ *G10L 19/005* (2013.01); *H04L 43/0829* (2013.01); *H04L 65/70* (2022.05); *H04L 65/75* (2022.05)

(58) Field of Classification Search
USPC ....................................................... 704/1–504
See application file for complete search history.

(56) References Cited

U.S. PATENT DOCUMENTS 8,892,691 B2 * 11/2014 Pantos ................ G06F 16/4387
709/219
10,269,357 B2 * 4/2019 Zhang ..................... G10L 19/06
(Continued)

FOREIGN PATENT DOCUMENTS

| CN | 102307302 A | 1/2012 |
| CN | 103187066 A | 7/2013 |

(Continued)

OTHER PUBLICATIONS

International Search Report of the International Searching Authority for State Intellectual Property Office of the People's Republic of China in PCT application No. PCT/CN2021/075612 dated Apr. 6, 2021, which is an International application corresponding to this U.S. application.

(Continued)

*Primary Examiner* — Marcus T Riley
(74) *Attorney, Agent, or Firm* — Kolitch Romano Dascenzo Gates LLC

(57) ABSTRACT

Provided is a method for encoding live-streaming data, including: acquiring first state information associated with a current data frame; generating backup state information by backing up the first state information; generating a first encoded data frame by encoding the current data frame based on a first bit rate and the first state information; generating reset state information by resetting the updated first state information based on the backup state information; generating a second encoded data frame by encoding the current data frame based on a second bit rate and the reset state information; and generating a first target data frame (Continued)

corresponding to the current data frame based on the first encoded data frame and the second encoded data frame.

14 Claims, 6 Drawing Sheets

(51) Int. Cl.
*H04L 65/75* (2022.01)
*H04L 43/0829* (2022.01)

(56) References Cited

U.S. PATENT DOCUMENTS

| | | | | |
|---|---|---|---|---|
| 10,291,365 | B2* | 5/2019 | Moision | H04B 10/1123 |
| 10,652,580 | B2* | 5/2020 | Shi | H04N 19/172 |
| 2004/0042498 | A1* | 3/2004 | Furuness | H04J 3/0608 |
| | | | | 370/522 |
| 2005/0123058 | A1* | 6/2005 | Greenbaum | H04N 19/187 |
| | | | | 375/240 |
| 2011/0075758 | A1* | 3/2011 | Nam | H04L 1/007 |
| | | | | 375/295 |
| 2012/0069131 | A1* | 3/2012 | Abelow | G06Q 30/0601 |
| | | | | 345/589 |
| 2013/0173259 | A1* | 7/2013 | Mittal | G10L 19/12 |
| | | | | 704/201 |
| 2014/0215541 | A1* | 7/2014 | Horen | H04N 21/2181 |
| | | | | 725/109 |
| 2015/0340046 | A1* | 11/2015 | Chen | G10L 19/032 |
| | | | | 704/500 |
| 2018/0191431 | A1* | 7/2018 | Moision | H04B 10/1123 |
| 2019/0327463 | A1* | 10/2019 | Zhao | H04N 19/103 |
| 2020/0162765 | A1* | 5/2020 | Lv | H04N 21/242 |
| 2020/0219519 | A1* | 7/2020 | Wang | G10L 19/18 |
| 2021/0126834 | A1* | 4/2021 | Azzam | H04L 43/0882 |
| 2022/0148603 | A1* | 5/2022 | Xing | H04L 43/0829 |

FOREIGN PATENT DOCUMENTS

| | | | | |
|---|---|---|---|---|
| CN | 103280222 | A | 9/2013 | |
| CN | 103533386 | A | 1/2014 | |
| CN | 104837042 | A | 8/2015 | |
| CN | 105530449 | A | 4/2016 | |
| CN | 106169998 | A | 11/2016 | |
| CN | 107369453 | A | 11/2017 | |
| CN | 107592540 | A | 1/2018 | |
| CN | 108093257 | A | 5/2018 | |
| CN | 108769826 | A | 11/2018 | |
| CN | 109167965 | A | 1/2019 | |
| CN | 109524015 | A | 3/2019 | |
| CN | 109587510 | A | 4/2019 | |
| CN | 110800298 | A | 2/2020 | |
| CN | 111277864 | A * | 6/2020 | ........... G10L 19/005 |
| CN | 111277864 | A | 6/2020 | |
| WO | 2019128592 | A1 | 7/2019 | |

OTHER PUBLICATIONS

The State Intellectual Property Office of People's Republic of China, First Office Action in Patent Application No. CN202010099025.7 dated May 14, 2021, which is a foreign counterpart application corresponding to this U.S. Patent Application, to which this application claims priority.
Notification of Completion of Formalities for Patent Register Application No. 202010099025.7, dated Aug. 18, 2021.
Extended European Search Report Communication Pursuant to Rule 62 EPC, dated Oct. 10, 2022 in Patent Application No. EP 21757025.8, which is a foreign counterpart application.
Seo, Beomjoo et al.; "An experimental study of video uploading from mobile devices with HTTP streaming", Proceeding MMSys '12 Proceedings of the 3rd Multimedia Systems Conference, abstract, p. 215, col. 2—p. 216, col. 2, p. 217, col. 2—p. 219, col. 1, p. 222, col. 1, figure 1, Feb. 22, 2012.
Valin, Jean-Marc et al.; "High-Quality, Low-Delay Music Coding in the Opus Codec", Arxiv.org, Cornell University Library, 201 Olin Library Cornell University Ithaca, NY14853, abstract , p. 2, col. 1-col. 2, p. 3, col. 2, Feb. 15, 2016.

* cited by examiner

METHOD FOR ENCODING LIVE-STREAMING DATA AND ENCODING DEVICE

CROSS-REFERENCE TO RELATED APPLICATION

This application is a continuation application of international application No. PCT/CN2021/075612, filed on Feb. 5, 2021, which claims priority to Chinese Patent Application No. 202010099025.7, filed on Feb. 18, 2020 and entitled "LIVE STREAMING DATA ENCODING METHOD AND DEVICE, CIRCULATION SYSTEM AND ELECTRONIC EQUIPMENT", the disclosures of which are herein incorporated by reference in their entireties.

TECHNICAL FIELD

The present disclosure relates to the technology field of co-hosting in live-streaming, and in particular relates to a method for encoding live-streaming data and an encoding device.

BACKGROUND

Co-hosting in live-streaming is now a very common commercial entertainment mode. More and more people are co-hosting in live-streaming by mobile phones or computers. An anchor (or a streamer) terminal co-hosts with two or more people (guests) to achieve multi-terminal live-streaming.

SUMMARY

The present disclosure provides a method for encoding live-streaming data and an encoding device. The technical solution of the present disclosure is as follows.

According to one aspect of embodiments of the present disclosure, a method for encoding live-streaming data is provided. The method is applicable to an encoding device and includes: acquiring first state information associated with a current data frame, wherein the current data frame is a data frame in the live-streaming data; generating backup state information by backing up the first state information; generating a first encoded data frame by encoding the current data frame based on a first bit rate and the first state information, wherein the first state information is updated upon completion of the encoding; generating reset state information by resetting the updated first state information based on the backup state information, wherein the reset state information is consistent with the first state information prior to the updating; generating a second encoded data frame by encoding the current data frame based on a second bit rate and the reset state information, wherein the second bit rate is different from the first bit rate; and generating a first target data frame corresponding to the current data frame based on the first encoded data frame and the second encoded data frame.

In some embodiments, the current data frame includes an audio frame; and the first state information includes: at least one of a sampling rate, a number of sound channels, a bandwidth, a bit rate, voice activity detection information, entropy encoding information, a noise shaping gain, or a linear prediction coefficient.

In some embodiments, the acquiring the first state information associated with the current data frame includes: integrating at least one of the sampling rate, number of sound channels, bandwidth, bit rate, voice activity detection information, entropy encoding information, noise shaping gain, or linear prediction coefficient of processed history data frame; and determining the first state information based on the at least one of the sampling rate, number of sound channels, bandwidth, bit rate, voice activity detection information, entropy encoding information, noise shaping gain, or linear prediction coefficient as integrated.

In some embodiments, the method further includes: acquiring a second target data frame corresponding to an adjacent data frame, wherein the adjacent data frame is a data frame adjacent to the current data frame in the live-streaming data; acquiring a long-term prediction parameter, wherein the long-term prediction parameter is less than a parameter threshold; and sending the first target data frame and the second target data frame to a decoding device based on the long-term prediction parameter, such that the decoding device decodes the first target data frame and the second target data frame based on the long-term prediction parameter.

In some embodiments, acquiring the long-term prediction parameter includes: acquiring a packet loss rate of a history period; and acquiring the long-term prediction parameter in response to the packet loss rate being higher than a preset packet loss rate threshold.

In some embodiments, acquiring the first target data frame corresponding to the current data frame based on the first encoded data frame and the second encoded data frame includes: integrating the first encoded data frame and the second encoded data frame, and determining the first target data frame based on an integrated result.

According to another aspect of the embodiments of the present disclosure, a system for transferring live-streaming data is provided. The system includes an encoding device and a decoding device; wherein the encoding device is configured to generate a fidelity encoded data frame by encoding a current data frame based on a fidelity bit rate and first state information associated with the current data frame; acquire a compressed encoded data frame corresponding to history data frame; combine the compressed encoded data frame and the fidelity encoding data frame into a data composite packet; and send the data composite packet to the decoding device, wherein the current data frame is a data frame in the live-streaming data, the compressed encoded data frame is generated by encoding the history data frame based on compression bit rate and second state information associated with the history data frame, and the history data frame is a data frame corresponding to a history moment before the current data frame; and the decoding device is configured to generate a compressed data frame and a first fidelity data frame by decoding the data composite packet; generate corresponding live-streaming data based on the compressed data frame and the first fidelity data frame by replacing, in response to receiving loss information of a second fidelity data frame, the second fidelity data frame with the compressed data frame, wherein the second fidelity data frame is a data frame generated based on the history data frame and the fidelity bit rate.

According to another aspect of the embodiments of the present disclosure, an encoding device is provided. The encoding device includes a processor and a memory configured to store at least one instruction executable by the processor; wherein the processor, when executing the at least one instruction, is caused to perform: acquiring first state information associated with a current data frame, wherein the current data frame is a data frame in the live-streaming data; generating backup state information by backing up the first state information; generating a first encoded data frame by encoding the current data frame based on a first bit rate and the first state information, wherein the first state information is updated upon completion of the encoding; generating reset state information by resetting the updated first state information based on the backup state information, wherein the reset state information is consistent with the first state information prior to the updating; generating a second encoded data frame by encoding the current data frame based on a second bit rate and the reset state information, wherein the second bit rate is different from the first bit rate; and generating a first target data frame corresponding to the current data frame based on the first encoded data frame and the second encoded data frame.

DETAILED DESCRIPTION

During the co-hosting, it is necessary to transfer signals between the anchor terminal and the guest terminal. For example, the guest terminal encodes recorded live-streaming data and transmits it to the anchor terminal, and the anchor terminal decodes the encoded live-streaming data for playing. During the signal transferring, packet loss is inevitable. When the live-streaming data is lost, the live-streaming data received by the anchor terminal is seriously damaged, so that packet loss recovery in the process of the co-hosting is a necessary technology.

Figure 1:
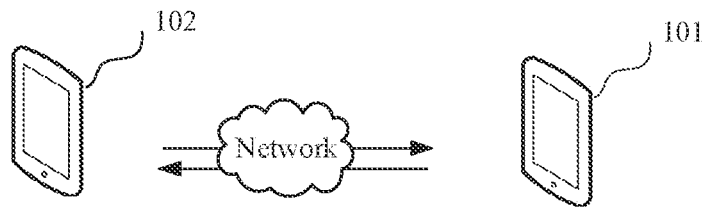
FIG. 1 is a schematic diagram of an implementation environment of a method for encoding live-streaming data according to some embodiments of the present disclosure.

The method for encoding live-streaming data according to the present disclosure is applicable to the implementation environment as shown in FIG. 1. The implementation environment includes an encoding device 101 and a decoding device 102, which communicate with each other over a network. The encoding device 101 encodes a current data frame based on a first bit rate and a second bit rate respectively by the same state information to correspondingly generate a first encoded data frame and a second encoded data frame and sends the two encoded data frames to the decoding device 102, and the decoding device 102 performs decryption to acquire the corresponding live-streaming data. In some embodiments, both the encoding device 101 and the decoding device 102 are implemented by a client, as long as they have corresponding encoding or decoding functions.

In some embodiments, the encoding device 101 is implemented by an encoder or an electronic device with the encoding function, wherein the encoder is an Opus encoder, a celt encoder, an AAC encoder, etc., and the electronic device is a mobile phone, a computer, a digital broadcasting terminal, a message receiving and sending device, a game console, a tablet device, a medical equipment, a fitness device, a personal digital assistant, etc.; the decoding device 102 is also implemented by a decoder or an electronic device with the decoding function, the types of the electronic device are as above, and the present disclosure does not limit the type of the decoder. In some embodiments, in the scenario of co-hosting in the live-streaming, the co-hosting is realized by making the anchor terminal communicate with a guest terminal through their respective clients. And then the live-streaming is achieved by sending, by the client of the anchor terminal, the communication data of the two to an audience terminal.

Figure 2:
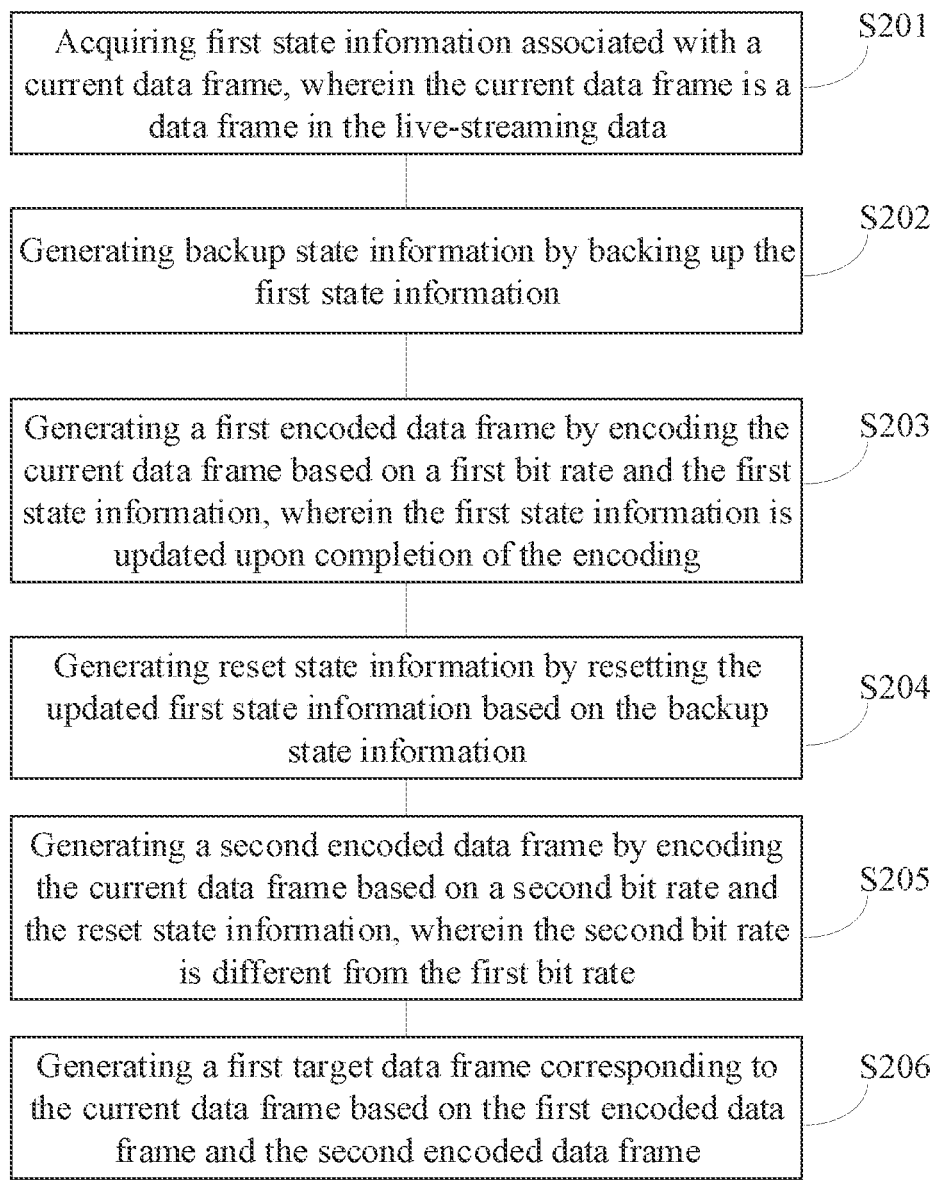
FIG. 2 is a flowchart of a method for encoding live-streaming data according to some embodiments of the present disclosure.

FIG. 2 is a flowchart of a method for encoding live-streaming data according to an embodiment. As shown in FIG. 2, the method for encoding live-streaming data is performed by the encoding device and includes steps S201, S202, S203, S204, S205, and S206, and the contents are as follows.

In S201, first state information associated with a current data frame is acquired, wherein the current data frame is a data frame in the live-streaming data.

In some embodiments, the live-streaming data is audio recorded through a live-streaming platform, audio-related data, etc. The live-streaming data corresponding to a certain period may be split into multiple data frames, for example, one data frame corresponding to each moment. The length of the specific period is determined according to actual conditions, which is not limited by the present disclosure. In some embodiments, the live-streaming data refers to interaction data between an anchor terminal and the guest/audience terminal.

Figure 3:
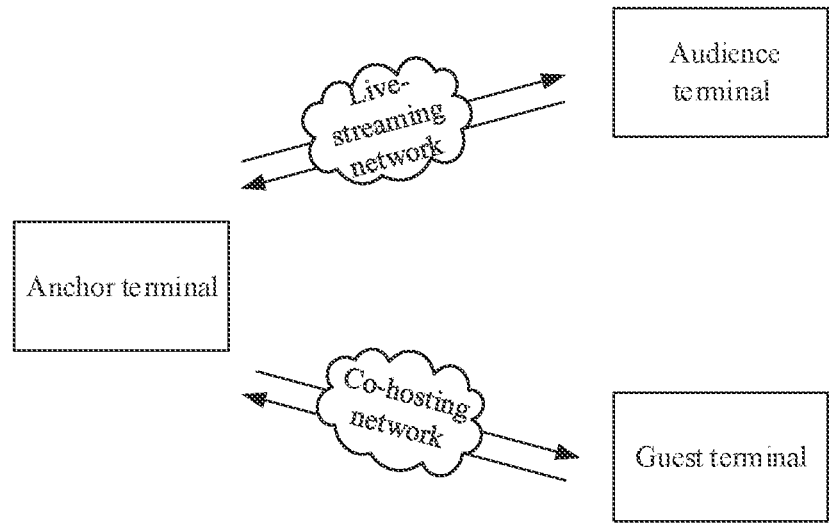
FIG. 3 is a flowchart of a method for an anchor terminal to communicate with an audience terminal and a guest terminal according to some embodiments of the present disclosure.

A live-streaming and co-hosting are explained as follows: in the live-streaming platform, the communication between the anchor terminal and the audience terminal and the communication between the anchor terminal and the guest terminal are as shown in FIG. 3. The anchor terminal records the live-streaming data and sends the recorded live-streaming data to the audience terminal over a live-streaming network for live-streaming. The anchor terminal further establishes a connection with the guest terminal for co-hosting, that is, the anchor terminal may communicate with the guest terminal over a co-hosting network during the live-streaming, and communication information of the anchor terminal and the guest terminal are integrated to be sent to the audience terminal In the embodiment of the present disclosure, the encoder is implemented by the anchor terminal, the guest terminal, or the audience terminal. The live-streaming network and the co-hosting network are the same or different.

In some embodiments, the current data frame is a data frame in the live-streaming data at the current running moment (i.e., the current moment), and there are adjacent data frames before and after the current data frame. In addition, a history moment before the current data frame also corresponds to a history data frame. In some embodiments, the history moment is a moment or several moments before the current moment. It should be noted that the moment may be considered as a sampling moment, that is, one moment corresponds to one data frame.

The state information (also called as context) refers to state information of the current data frame, or the state information acquired by analyzing and integrating the state information of the history data frame of the current data frame by the encoding device.

In the case that the live-streaming data is the audio, that is, the current data frame includes an audio frame; the acquiring the first state information associated with the current data frame includes: acquiring at least one of a sampling rate, a number of sound channels, a bandwidth, a bit rate, voice activity detection information, entropy encoding information, a noise shaping gain, and a linear prediction coefficient for the current data frame as the first state information or the initial state information. That is, the first state information includes at least one of a sampling rate, a number of sound channels, a bandwidth, a bit rate, voice activity detection information, entropy encoding information, a noise shaping gain, or a linear prediction coefficient. This information characterizes the running state of the live-streaming data. As these state information are combined to encode the current data frame, a running state of the current data frame, and a running condition of the data frame and requirements for a running environment are fully considered, such that the live-streaming data decoded by the decoding device is closer to the original live-streaming data, and at the same time, it can be ensured that the decoded data frame can be output normally at the decoding device, which effectively guarantees a live-streaming effect.

It should be noted that at least one refers to one or more; for example, at least one of the sampling rate, number of sound channels, bandwidth, bit rate, voice activity detection information, entropy encoding information, noise shaping gain, or linear prediction coefficient includes any one of the following state information or any combination of the following information: the sampling rate, number of sound channels, bandwidth, bit rate, voice activity detection information, entropy encoding information, noise shaping gain, and linear prediction coefficient.

The voice activity detection information refers to the information acquired through detection on the live-streaming audio by a voice activity detection (VAD) technology. The purpose of the VAD is to detect the presence of a voice signal. Therefore, the voice activity detection information refers to whether a voice exists or not. In some embodiments, the sampling rate, number of sound channels, bandwidth, bit rate, voice activity detection information, entropy encoding information, noise shaping gain, or linear prediction coefficient of the history data frame processed by the encoder are determined, and at least one of these data is integrated to generate the sampling rate, number of sound channels, bandwidth, bit rate, voice activity detection information, entropy encoding information, noise shaping gain and/or linear prediction coefficient for the current data frame. That is, at least one of the sampling rate, number of sound channels, bandwidth, bit rate, voice activity detection information, entropy encoding information, noise shaping gain, or linear prediction coefficient of processed history data frame is integrated; and the first state information is determined based on the at least one of the sampling rate, number of sound channels, bandwidth, bit rate, voice activity detection information, entropy encoding information, noise shaping gain, or linear prediction coefficient as integrated. For example, an average value of the sampling rates of respective history data frames is calculated, and the average value is determined as the sampling rate for the current data frame, that is, the average value is determined as the first state information.

In S202, backup state information is generated by backing up the first state information.

In this step, the first state information is copied, the copied first state information is taken as the backup state information, and the backup state information is stored in a memory of the encoding device for use.

The first state information is recorded as context_ori, and the backup state information is recorded as context_copy.

In S203, a first encoded data frame is generated by encoding the current data frame based on a first bit rate and the first state information; wherein the first state information is updated upon completion of the encoding.

The bit rate refers to the number of bits transmitted per second. The higher the bit rate is, the more data transmitted per second is, and the clearer the sound is. The hit rate in the sound refers to the amount of binary data per unit time after an analog sound signal is converted into a digital sound signal, and is an indirect measurement index of audio quality. The first bit rate in this step is a bit rate used for encoding the current data frame, and its size is determined according to actual requirements.

After encoding, the newly encoded data frame (the current data frame) will update the context because the previous signal and the next signal are associated, and one data frame is encoded in combination with the state information and the history data frame. In some embodiments, when the current data frame is acquired, the encoder acquires the first state information according to a previous history encoding situation (that is, in combination with the state information of the previous several data frames), and encodes the current data frame through the first state information, and then the current data frame will be taken as the history data frame (a data frame that has been encoded) and the first state information will be updated.

In S204, reset state information is generated by resetting the updated first state information based on the backup state information.

The reset state information is consistent with the first state information prior to the updating.

In S205, a second encoded data frame is generated by encoding the current data frame based on a second bit rate and the reset state information, wherein the second bit rate is different from the first bit rate.

The second bit rate is the same concept as the first bit rate, but the second bit rate is different from the first bit rate. In some embodiments, the first bit rate is greater than or less than the second bit rate. In the present disclosure, the encoder encodes the live-streaming data based on different bit rates, and can generate target data frames at different bit rates. The target data frames generated in this way can be subjected to packet loss recovery at the decoding device, for example, if the data frame corresponding to the first encoded data frame is lost, it can be replaced by the data frame corresponding to the second encoded data frame, so as to realize the packet loss recovery of the data frame corresponding to the first encoded data frame.

After being updated, the first state information is recorded as context_temp. The current data frame needs to be encoded for the second time (that is, the current data frame is encoded based on the second bit rate), or even encoded for the third time, if the current data frame is encoded directly based on the updated first state information context_temp and the second bit rate, then the running state of the second encoded data frame generated by encoding will be different from that of the first encoded data frame, that is, the running state of the encoded data frame corresponding to the first bit rate is different from that of the encoded data frame corresponding to the second bit rate, which must cause a larger change in the running state when the decoding device switches the bit rate, resulting in the occurrence of noise. Therefore, in this step, the current data frame is encoded by resetting the state information, such that the state information corresponding to the second encoded data frame is consistent with the state information corresponding to the first encoded data frame, that is, the running states of the two are consistent.

Figure 4:
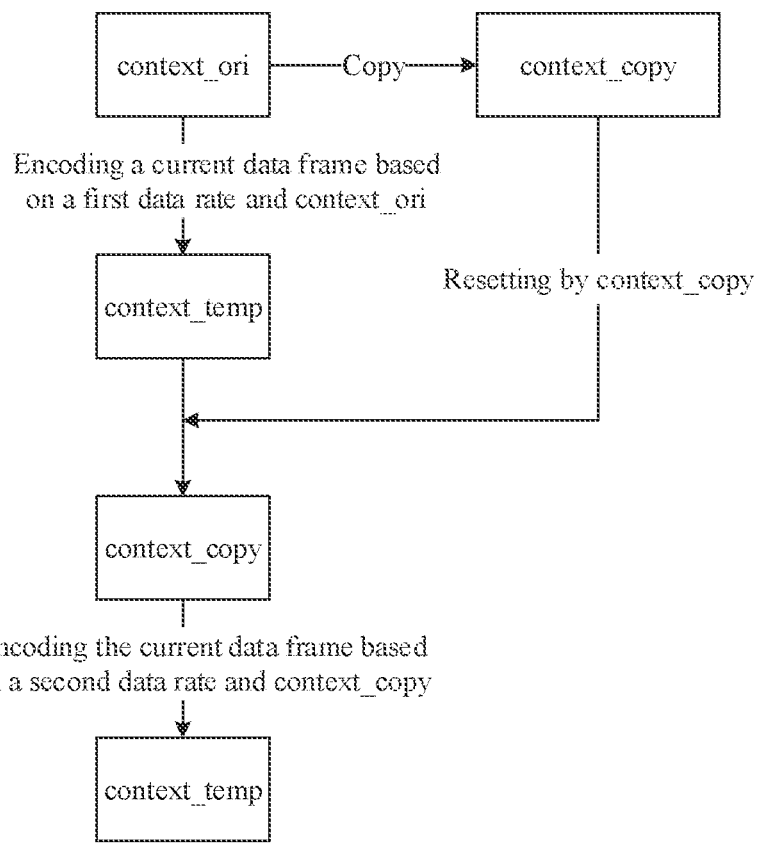
FIG. 4 is a flowchart showing a change of state information according to some embodiments of the present disclosure.

In some embodiments, the flowchart of processing the context is as shown in FIG. 4. In FIG. 4, the first state information is context_ori, the backup state information context_copy is generated after copying the first state information, and the current data frame is encoded based on the first bit rate and the first state information context_ori to generate the first encoded data frame. At this time, the first state information context_ori is updated to context_temp, context_temp is reset based on the backup state information context_copy, and then the state information corresponding to the current data frame becomes the reset state information (also recorded as context_copy). At this time, based on the second bit rate and the reset state information context_copy, the current data frame is encoded to generate the second encoded data frame. Then the process of encoding the current data frame by the encoder based on the first bit rate and the second hit rate is completed.

In S206, a first target data frame corresponding to the current data frame is generated based on the first encoded data frame and the second encoded data frame.

In this step, after generating the first encoded data frame and the second encoded data frame, the first target data frame is generated. In some embodiments, the first encoded data frame and the second encoded data frame are integrated and the first target data frame is determined based on an integrated result.

S201 to S206 realize the encoding of the current data frame, such that the live-streaming data contains not only the current data frame but also integrates additional information. Therefore, after the first target data frame is generated, data frames subsequent to the current data frame may be continuously encoded frame by frame in the same way to generate the corresponding target data frames until respective frames in the live-streaming data are completely encoded, or main frames that can characterize the live-streaming data are completely encoded.

In the above method for encoding live-streaming data, the decoding device needs to switch the bit rate when outputting the data frames of different bit rates. In this solution, the first encoded data frame and the second encoded data frame are generated by the same encoder based on the same state information, which effectively reduces the noise that occurs during switching the hit rates by the decoding device.

In some embodiments, for the case of co-hosting of the live-streaming terminal and the guest terminal (in this case, the live-streaming data is called co-hosting live-streaming data), and the live-streaming terminal and the guest terminal may be both used as the encoding device and the decoding device respectively. For example, the live-streaming terminal encodes the audio and sends the encoded audio to the guest terminal, and the guest terminal decodes the encoded audio. Similarly, the guest terminal may also encode the audio and send the encoded audio to the anchor terminal, and the anchor terminal decodes the encoded audio. The number of guest terminals connected to the live-streaming terminal may be more than one. In this case, it is assumed that the live-streaming terminal performs encoding, then the live-streaming terminal needs to encode the co-hosting live-streaming data of multiple guest terminals. In some embodiments, the live-streaming terminal may encode the co-hosting live-streaming data of guest terminals respectively, and then integrate the target data frames corresponding to respective guest terminals upon completion of the encoding; or according to the time sequence, the live-streaming terminal may encode and integrate the data frames of different guest terminals in the same time sequence into one target data frame, and then encode and integrate the data frames of the next time sequence.

In some embodiments, after generating the first target data frame corresponding to the current data frame based on the first encoded data frame and the second encoded data frame, the method further includes: acquiring a second target data frame corresponding to the adjacent data frame, wherein the adjacent data frame is a data frame adjacent to the current data frame in the live-streaming data; acquiring a long-term prediction parameter, wherein the long-term prediction parameter is less than a preset parameter threshold; and sending the first target data frame and the second target data frame to a decoding device based on the long-term prediction parameter, such that the decoding device decodes the first target data frame and the second target data frame based on the long-term prediction parameter.

The second target data frame is a target data frame generated by encoding the adjacent data frame of the current data frame.

In some embodiments, the adjacent data frame is a history data frame of the current data frame, or a subsequent data frame thereof (that is, a data frame that is later than the current moment in time sequence). The number of the adjacent data frames is one, two, or more than two. For example, the adjacent data frame is one previous data frame, or one subsequent data frame, one previous data frame and one subsequent data frame, N previous data frames, or N subsequent data frames, etc., wherein N is an integer greater than 1, which is determined according to actual conditions.

In some other embodiments, the adjacent data frames are all data frames in the live-streaming data other than the current data frame, that is, the encoding device encodes respective frames of the live-streaming data and generates the corresponding target data frames respectively. In this way, the decoding device may generate the complete streaming data by decoding the target data frames.

The long-term prediction parameter is also short for an LTP parameter. The LTP parameter is configured to predict and remove redundant information within one period. In the encoding process, a correlation relationship between live-streaming data frames is predicted, and then redundancy is removed. When the LTP parameter is not enabled, it simply considers the correlation relationship between adjacent data frames, such that the coupling between adjacent data frames is larger. In the present disclosure, LTP parameter is less than the preset parameter threshold. This parameter will make the sound quality worse in the case of no packet loss (relative to LTP configuration that does not reduce the correlation between the frames), but in the case of packet loss, the LTP parameter value is reduced, which can reduce the coupling between the frames, and the impact of a lost audio frame on subsequent audio frames is reduced, which further reduces the jump during switching between packets of different bit rates, and makes the live-streaming effect better. The above parameter threshold is determined according to actual conditions, which is not limited by the present disclosure.

In some embodiments, the acquiring the long-term prediction parameter includes: acquiring a packet loss rate of a history period; and acquiring the long-term prediction parameter in response to the packet loss rate being higher than a preset packet loss rate threshold.

The history period is a preset period of any duration. The time length of the history period and the packet loss rate threshold are determined according to actual conditions, which is not limited by the present disclosure. When the packet loss rate is higher, frequent bit rate switching may occur. For example, a master packet is lost every other packet, such that the received effective master packets are 1, 3, 5, 7 . . . , and the lost master packets 2, 4, 6, 8 . . . need to be replaced h slave packets. The bit rates of the master packet and the slave packet are different, such that the switching of bit rate packets occurs continuously, which causes a serious noise interference. At this time, the number of bits allocated to the LTP parameter is reduced, weight of the long-term prediction parameter is reduced, and the coupling between the frames is reduced, thereby reducing the jump during switching between the packets of different bit rates, and preventing the noise during switching between the bit rate packets.

In some embodiments, the first bit rate is less than the second bit rate. The first bit rate is a compression bit rate for compression encoding of the live-streaming data frames (also called a low bit rate), and the second hit rate is a fidelity bit rate for fidelity encoding of the live-streaming data frames (also called a high bit rate). The current data frame is encoded based on the compression bit rate and the fidelity bit rate respectively to generate a corresponding compressed encoded data frame and a corresponding fidelity bit rate data frame. When being sent to the decoding device, the fidelity bit rate data frame is sent to the decoding device as the master packet. In response to the decoding device being capable of decoding the corresponding current data frame from the fidelity bit rate data frame, the operation of the next step is performed, and in response to the decoding device being incapable of decoding the corresponding current data frame from the fidelity bit rate data frame, the corresponding current data frame is decoded from the compression bit rate data frame.

In some embodiments, the number of the first bit rates and the second hit rates is one, two, or more than two. One type of target data frames is generated by the encoding based on one bit rate. In this way, multiple types of target data frames can be generated by encoding the current data frame.

In some other embodiments, in addition to the first bit rate and the second bit rate, a third bit rate, a fourth bit rate, etc., may also be included, that is, the current data frame may be encoded based on multiple bit rates to generate the corresponding multiple target data frames, such that the decoding device performs packet loss recovery and other corresponding operations.

Figure 5:
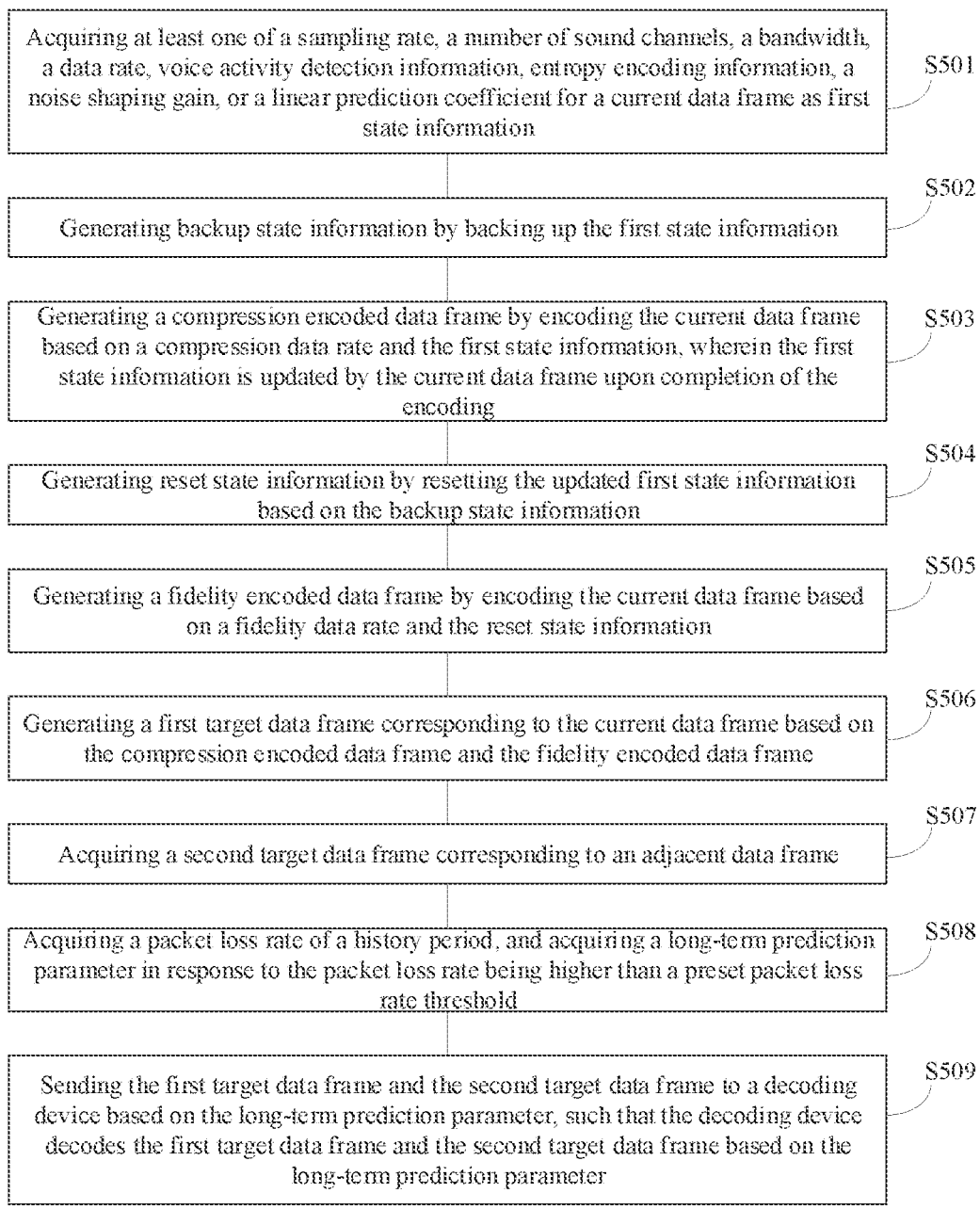
FIG. 5 is a flowchart of another method for encoding live-streaming data according some embodiments of the present disclosure.

FIG. 5 is a flowchart of a method for encoding live-streaming data according to an embodiment. As shown in FIG. 5, the method for encoding live-streaming data is performed by an encoder. By taking co-hosting live-streaming data as an example of the live-streaming data, the method for encoding live-streaming data includes the following steps.

In S501, at least one of a sampling rate, a number of sound channels, a bandwidth, a bit rate, voice activity detection information, entropy encoding information, a noise shaping gain, or a linear prediction coefficient for a current data frame is acquired as first state information.

In S502, backup state information is generated by backing up the first state information.

In S503, a compressed encoded data frame is generated by encoding the current data frame based on a compression bit rate and the first state information, wherein the first state information is updated by the current data frame upon completion of the encoding.

In some embodiments, the compression bit rate corresponds to the aforementioned first bit rate, and the compressed encoded data frame corresponds to the aforementioned first encoded data frame.

In S504, reset state information is generated by resetting the updated first state information based on the backup state information.

In S505, a fidelity encoded data frame is generated by encoding the current data frame based on a fidelity bit rate and the reset state information.

In some embodiments, the fidelity bit rate corresponds to the aforementioned second bit rate, and the fidelity encoded data frame corresponds to the aforementioned second encoded data frame.

In S506, a first target data frame corresponding to the current data frame is generated based on the compressed encoded data frame and the fidelity encoded data frame.

In S507, a second target data frame corresponding to an adjacent data frame is acquired.

In S508, a packet loss rate of a history period is acquired; and a long-term prediction parameter is acquired in response to the packet loss rate being higher than a preset packet loss rate threshold.

In S509, the first target data frame and the second target data frame are sent to a decoding device based on the long-term prediction parameter, such that the decoding device decodes the first target data frame and the second target data frame based on the long-term prediction parameter.

In the above method for encoding live-streaming data, the decoding device needs to switch the bit rate when outputting data frames of different bit rates. The compressed encoded data frame and the fidelity encoded data frame in this solution are acquired by the same encoding device based on the same state information, which effectively reduces the noise that occurs during switching the bit rates by the decoding device.

Figure 6:
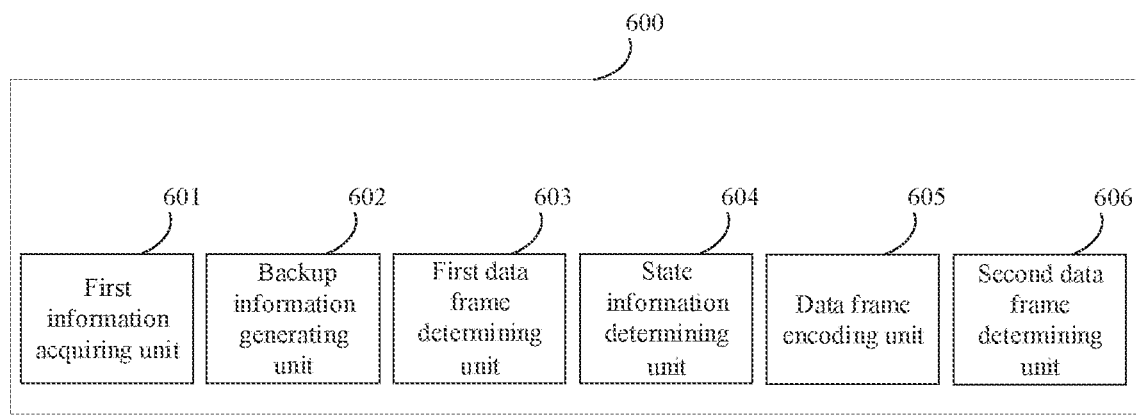
FIG. 6 is a block diagram of an apparatus for encoding live-streaming data according to some embodiments of the present disclosure.

FIG. 6 is a block diagram of an apparatus for encoding live-streaming data according to an embodiment. Referring to FIG. 6, the apparatus includes a first information acquiring unit 601, a backup information generating unit 602, a first determining unit 603, a state information determining unit 604, a data frame encoding unit 605, and a second determining unit 606.

The first information acquiring unit 601 is configured to acquire first state information associated with a current data frame, wherein the current data frame is a data frame in the live-streaming data.

The backup information generating unit 602 is configured to generate backup state information by backing up the first state information.

The first data frame determining unit 603 is configured to generate a first encoded data frame by encoding the current data frame based on a first bit rate and the first state information, wherein the first state information is updated upon completion of the encoding.

The state information determining unit 604 is configured to generate reset state information by resetting the updated first state information based on the backup state information, wherein the reset state information is consistent with the first state information prior to the updating.

The data frame encoding unit 605 is configured to generate a second encoded data frame by encoding the current data frame based on a second bit rate and the reset state information, wherein the second bit rate is different from the first bit rate.

The second data frame determining unit 606 is configured to generate a first target data frame corresponding to the current data frame based on the first encoded data frame and the second encoded data frame.

In the abovementioned apparatus for encoding live-streaming data, the decoding device needs to switch the bit rate when outputting data frames of different bit rates. The first encoded data frame and the second encoded data frame in this solution are generated by encoding based on the same state information, which effectively reduces the noise that occurs during switching the bit rates by the decoding device.

In some embodiments, the current data frame includes an audio frame; and the first state information includes at least one of a sampling rate, a number of sound channels, a bandwidth, a bit rate, voice activity detection information, entropy encoding information, a noise shaping gain, or a linear prediction coefficient.

In some embodiments, the first information acquiring unit 601 is configured to integrate at least one of the sampling rate, number of sound channels, bandwidth, bit rate, voice activity detection information, entropy encoding information, noise shaping gain, or linear prediction coefficient of processed history data frame; and determine the first state information based on the at least one of the sampling rate, number of sound channels, bandwidth, bit rate, voice activity detection information, entropy encoding information, noise shaping gain, or linear prediction coefficient as integrated.

In some embodiments, the apparatus for encoding live-streaming data further includes a data frame acquiring unit configured to acquire a second target data frame corresponding to an adjacent data frame, wherein the adjacent data frame is a data frame adjacent to the current data frame in the live-streaming data; a prediction parameter acquiring unit configured to acquire a long-term prediction parameter, wherein the long-term prediction parameter is less than a parameter threshold; and a data frame sending unit configured to send the first target data frame and the second target data frame to a decoding device based on the long-term prediction parameter, such that the decoding device decodes the first target data frame and the second target data frame based on the long-term prediction parameter.

In some embodiments, the prediction parameter acquiring unit includes a packet loss rate acquiring subunit configured to acquire a packet loss rate of a history period; and a prediction parameter acquiring subunit configured to acquire the long-term prediction parameter in response to the packet loss rate being higher than a preset packet loss rate threshold.

In some embodiments, the second data frame determining unit is configured to integrate the first encoded data frame and the second encoded data frame, and determine the first target data frame based on an integrated result.

Regarding the apparatus in the foregoing embodiment, the specific manner in which each module performs operations has been described in detail in the embodiments of the method, and will not be elaborated here.

Figure 7:
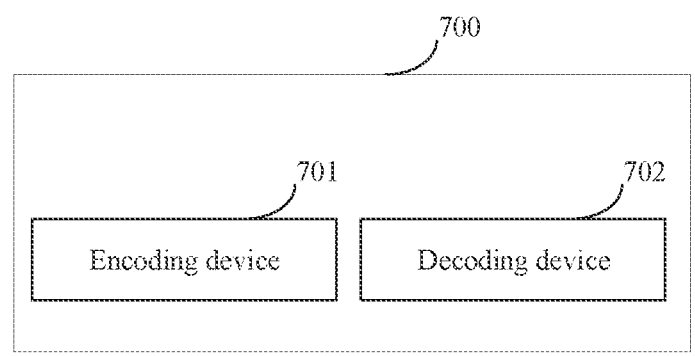
FIG. 7 is a block diagram of a system for transferring live-streaming data according to some embodiments of the present disclosure.

In some embodiments, as shown in FIG. 7, a system for transferring live-streaming data 700 is also provided and includes an encoding device 701 and a decoding device 702, which are in communication with each other over a network.

The encoding device 701 is configured to generate a fidelity encoded data frame by encoding a current data frame based on a fidelity bit rate and first state information associated with the current data frame; acquire a compressed encoded data frame corresponding to history data frame; combine the compressed encoded data frame and the fidelity encoding data frame into a data composite packet; and send the data composite packet to the decoding device, wherein the current data frame is a data frame in the live-streaming data, the compressed encoded data frame is generated by encoding the history data frame based on compression bit rate and second state information associated with the history data frame, and the history data frame is a data frame corresponding to a history moment before the current data frame; and the decoding device 702 is configured to generate a compressed data frame and a first fidelity data frame by decoding the data composite packet; generate corresponding live-streaming data based on the compressed data frame and the first fidelity data frame by replacing, in response to receiving loss information of a second fidelity data frame, the second fidelity data frame with the compressed data frame, wherein the second fidelity data frame is a data frame generated based on the history data frame and the fidelity bit rate. It should be noted that, the process of acquiring the second state information associated with the history data frame is similar to the above process of acquiring the first state information related to the current data frame, and is not described herein again.

In some embodiments, the fidelity bit rate is called a high bit rate, and the compression bit rate is called a low bit rate. Correspondingly, the fidelity encoded data frame and the compressed encoded data frame are called a high encoded data frame and a low encoded data frame respectively. In some embodiments, the fidelity encoded data frame is 24 K, and the compressed encoded data frame is 16 K.

In some embodiments, it is assumed that the current data frame is an $N^{th}$ frame, and the history data frames are an $(N-1)^{th}$ frame and an $(N-2)^{th}$ frame in an actual implementation scenario, the number of the history data frames may be more or less; in addition, a frame rate of the history data frames is greater than 1, for example, the frame rate is 2, and the history data frames are $(N-2)^{th}$, $(N-4)^{th}$, $(N-6)^{th}$ frames and so on.

Figure 8:
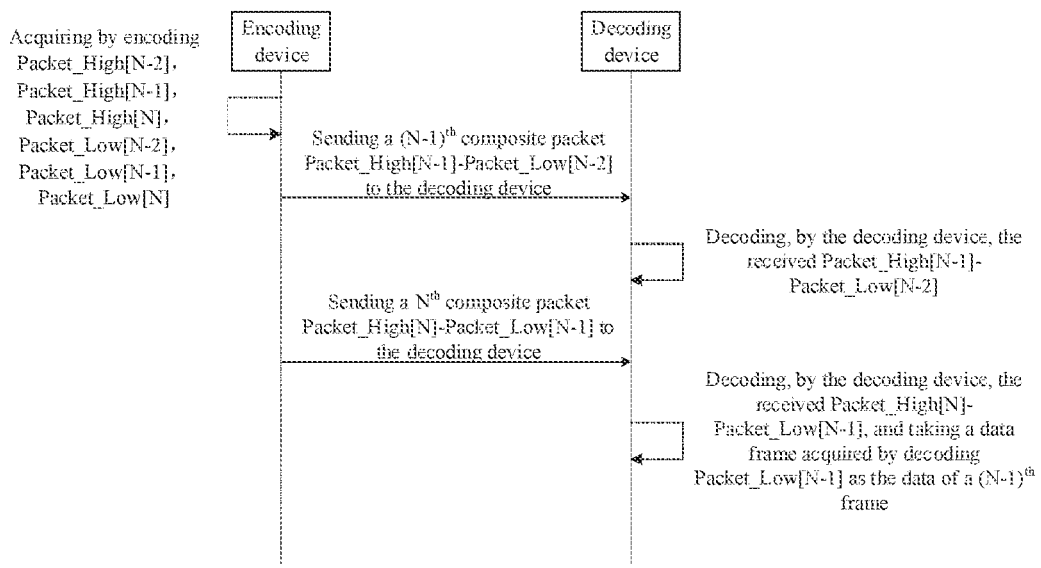
FIG. 8 is a time sequence diagram of the interaction between an encoding device and a decoding device according to some embodiments of the present disclosure.
Figure 9:
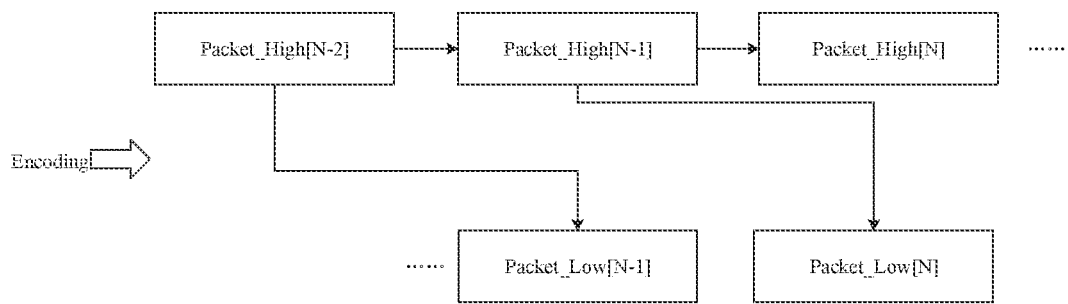
FIG. 9 is a schematic diagram of transmitting a target data frame according to some embodiments of the present disclosure.

In some embodiments, the process of transferring the live-streaming data between the encoding device and the decoding device is as shown in FIG. 8, The encoding device generates corresponding high encoded data frames and low encoded data frames for the $(N-2)^{th}$, $(N-1)^{th}$ and $N^{th}$ frames respectively, the high encoded data frame of the $N^{th}$ frame is recorded as Packet_High[N], and the low encoded data frame of the $N^{th}$ frame is recorded as Packet_Low[N]. Therefore, as shown in FIG. 9, the following encoded data frames are acquired: Packet_High[N−2], Packet_High[N−1], Packet_High[N] Packet_Low[N−2], Packet_Low[N−1] and Packet_Low[N]. Referring to FIG. 8, at the encoding device, it firstly sends a $(N-1)^{th}$ composite packet, Packet_High[N−1]-Packet_Low [N−2], to the decoding device.

Figure 10:
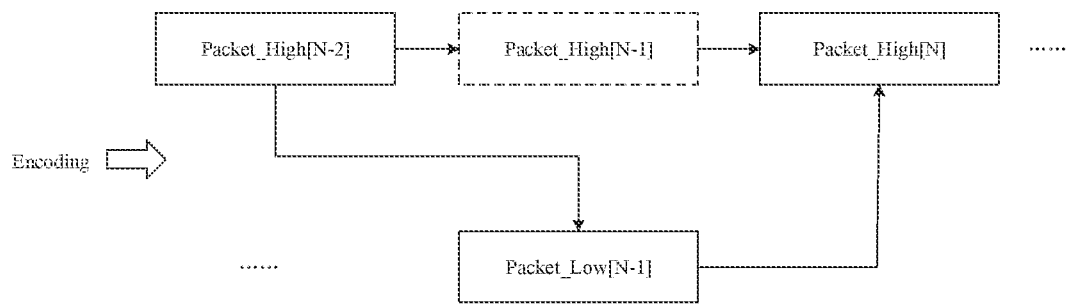
FIG. 10 is another schematic diagram of transmitting a target data frame according to some embodiments of the present disclosure.

In the illustrated embodiment, the $(N-1)^{th}$ composite packet includes Packet_High[N−1] and Packet_Low[N−2]. At the decoding device, it decodes the received $(N-1)^{th}$ composite packet, Packet_High[N−1]-Packet_Low[N−2], and waits for the next composite packet in response to finding that the master packet Packet_High[N−1] is lost (that is, loss information of the second fidelity data frame is received, as shown in the dashed box in FIG. 10); and the encoding device sends an $N^{th}$ composite packet, Packet_High[N]-Packet_Low[N−1], to the decoding device after a period. In the illustrated embodiment, the $N^{th}$ composite packet includes Packet_High[N] and Packet_Low[N−1].

The decoding device decodes the received $N^{th}$ composite packet, Packet_High[N]-Packet_Low[N−1], determines the data frame generated by decoding Packet_Low[N−1] as data of the $(N-1)^{th}$ frame, and replaces Packet_High[N−1] with Packet_Low[N−1]. At this time, the decoding device has acquired complete data of the $(N-1)^{th}$ frame and $N^{th}$ frame (i.e., Packet_Low[N−1] and Packet_High[N]), that is, the decoding device can acquire the entire live-streaming data.

Packet_Low[N−1] and Packet_High[N] generated in this way by the embodiment of the present disclosure come from the same encoder, and are both generated by encoding based on the same state information. Therefore, the noise is not generated when the encoder switches corresponding bit rates of Packet_Low[N−1] and Packet_High[N], which can effectively improve an audio output effect of co-hosting in live-streaming.

In some embodiments, after the corresponding live-streaming data is generated based on the compressed encoded data frame and the first fidelity data frame, the decoding device is further configured to generate the first fidelity data frame by decoding the data composite packet in a fidelity bit rate state, and generate the compressed data frame by decoding the data composite packet in a compression bit rate state.

The decoding device can output the decoded data frame. As packet loss occurs and the high bit rate data frame is replaced with the low bit rate data frame, switching between the high bit rate and the low bit rate is required when the data is output one by one. In some embodiments, the first fidelity data frame is generated by decoding the data composite packet in a fidelity bit rate state; and the compressed data frame is generated by decoding the data composite packet in a compression bit rate state.

In the system for transferring live-streaming data according to the above embodiment, the decoding device needs to switch the bit rate when outputting the data frames of different bit rates. The fidelity encoded data frame and the compressed encoded data frame in this solution come from the same encoder, and are generated by encoding based on the same state information. The decoding device decodes the data composite packet when receiving the data composite packet. In response to finding packet loss of a certain fidelity data frame, recovery is performed by the compressed data frame of the next frame for even the next several frames). At the same time, the live-streaming data can be generated based on the recovered data frame. When the live-streaming data is output, switching between the fidelity bit rate and the compression bit rate is required, and the state information corresponding to the fidelity data frame and the state information corresponding to the compressed data frame are the same, such that the decoding device does not generate noise when switching between bit rates.

Figure 11:
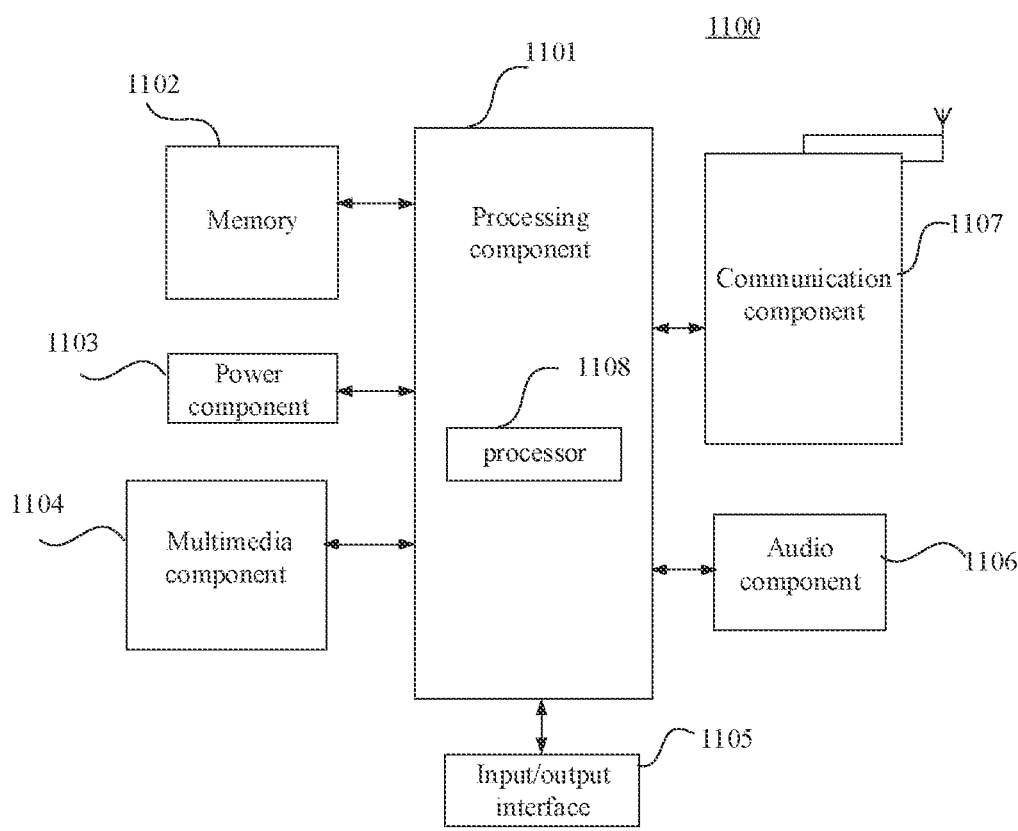
FIG. 11 is a block diagram of art encoding device according to some embodiments of the present disclosure.

In some embodiments, an encoding device 1100 is provided. Referring to FIG. 11, the encoding device 1100 includes one or more of the following components: a processing component 1101, a memory 1102, a power component 1103, a multimedia component 1104, an input/output (I/O) interface 1105, an audio component 1106 and a communication component 1107.

The processing component 1101 typically controls overall operations of the encoding device 1100, such as the operations associated with display, telephone calls, data communications, camera operations, and recording operations. The processing component 1101 includes one or more processors 1108 to execute instructions to perform all or part of the steps in the above-described methods. Moreover, the processing component 1101 includes one or more modules which facilitate the interaction between the processing component 1101 and other components. For instance, the processing component 1101 includes a multimedia module to facilitate the interaction between the multimedia component 1104 and the processing component 1101.

The memory 1102 is configured to store various types of data to support the operation of the encoding device 1100. Examples of such data include instructions for any applications or methods operated on the encoding device 1100, contact data, phonebook data, messages, pictures, videos, etc. The memory 1102 is implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1103 provides power to various components of the encoding device 1100. The power component 1103 includes a power management system, one or more power sources, and other components associated with the generation, management, and distribution of power of the encoding device 1100.

The multimedia component 1104 includes a screen providing an output interface between the encoding device 1100 and a user. In some embodiments, the screen includes a liquid crystal display (LCD) and a touch panel (TP). If the screen includes the touch panel, the screen is implemented as a touch screen to receive input signals from the user. The touch panel includes one or more touch sensors to sense touches, swipes, and gestures on the touch panel. The touch sensor not only senses a boundary of a touch or swipe action, but also detects the time duration and a pressure associated with the touch or swipe action. In some embodiments, the multimedia component 1104 includes a front camera and/or a rear camera. The front camera and/or the rear camera receive/s external multimedia data while the encoding device 1100 is in an operation mode, such as a photographing mode or a video mode. Each of the front camera and the rear camera is a fixed optical lens system or has focus and optical zoom capabilities.

The I/O interface 1105 provides an interface between the processing component 1101 and peripheral interface modules, such as a keyboard, a click wheel, buttons, and the like. The buttons include, but are not limited to, a home button, a volume button, a start button, and a lock button.

The audio component 1106 is configured to output and/or input audio signals. For example, the audio component 1106 includes a microphone ("MIC") configured to receive external audio signals when the encoding device 1100 is in an operation mode, such as a call mode, a recording mode, and a voice recognition mode. The received audio signal is further stored in the memory 1102 or transmitted via the communication component 1107. In some embodiments, the audio component 1106 further includes a speaker for outputting audio signals. In some embodiments, the live-streaming data is a co-hosting live-streaming audio, which is input into the encoding device by the audio component 106.

The communication component 1107 is configured to facilitate communication, wired or wirelessly, between the encoding device 1100 and other devices. The encoding device 1100 accesses a wireless network based on a communication standard, such as WiFi, service provider networks (2G, 3G, 4G or 5G), or a combination thereof. In some embodiments, the communication component 1107 receives a broadcast signal or broadcast associated information from an external broadcast management system via a broadcast channel. In some embodiments, the communication component 1107 further includes a near field communication (NFC) module to facilitate short-range communications. For example, the NEC module may be implemented based on a radio frequency identification (RFID) technology, an infrared data association (IrDA) technology, an ultra-wideband (UWB) technology, a Bluetooth (BT) technology, and other technologies.

In some embodiments, the encoding device 1100 is implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In some embodiments, the processor is configured to perform: acquiring first state information associated with a current data frame, wherein the current data frame is a data frame in the live-streaming data; generating backup state information by backing up the first state information; generating a first encoded data frame by encoding the current data frame based on a first bit rate and the first state information, wherein the first state information is updated upon completion of the encoding; generating reset state information by resetting the updated first state information based on the backup state information, wherein the reset state information is consistent with the first state information prior to the updating; generating a second encoded data frame by encoding the current data frame based on a second bit rate and the reset state information, wherein the second bit rate is different from the first bit rate; and generating a first target data frame corresponding to the current data frame based on the first encoded data frame and the second encoded data frame.

In some embodiments, the current data frame includes an audio frame; the first state information includes at least one of a sampling rate, a number of sound channels, a bandwidth, a bit rate, voice activity detection information, entropy encoding information, a noise shaping gain, or a linear prediction coefficient.

In some embodiments, the processor is further configured to acquire a second target data frame corresponding to an adjacent data frame, wherein the adjacent data frame is a data frame adjacent to the current data frame in the live-streaming data; acquire a long-term prediction parameter, wherein the long-term prediction parameter is less than a parameter threshold; and send the first target data frame and the second target data frame to a decoding device based on the long-term prediction parameter, such that the decoding device decodes the first target data frame and the second target data frame based on the long-term prediction parameter.

In some embodiments, the processor is further configured to: acquire a packet loss rate of a history period; and acquire the long-term prediction parameter in response to the packet loss rate being higher than a preset packet loss rate threshold.

In some embodiments, the processor is further configured to: integrate the first encoded data frame and the second encoded data frame, and determining the first target data frame based on an integrated result.

In some embodiments, there is also provided a non-transitory computer-readable storage medium storing at least one instruction thereon. For example, the instructions are included in the memory 1102, and are executed by the processor 1108 of the encoding device 1100 for performing the above-described methods. For example, the non-transitory computer-readable storage medium may be an ROM, an RAM, a CD-ROM, a magnetic tape, a floppy disc, an optical data storage device, and the like. The instructions in the storage medium are executed by the processor of the encoding device to implement part or all steps of the above-described methods.

In some embodiments, the at least one instruction, when executed by a processor of an encoding device, causes the encoding device to perform: acquiring first state information associated with a current data frame, wherein the current data frame is a data frame in the live-streaming data; generating backup state information by backing up the first state information; generating a first encoded data frame by encoding the current data frame based on a first bit rate and the first state information, wherein the first state information is updated upon completion of the encoding; generating reset state information by resetting the updated first state information based on the backup state information, wherein the reset state information is consistent with the first state information prior to the updating; generating a second encoded data frame by encoding the current data frame based on a second bit rate and the reset state information, wherein the second bit rate is different from the first bit rate; and generating a first target data frame corresponding to the current data frame based on the first encoded data frame and the second encoded data frame.

In some embodiments, the current data frame includes an audio frame; the first state information includes at least one of a sampling rate, a number of sound channels, a bandwidth, a bit rate, voice activity detection information, entropy encoding information, a noise shaping gain, or a linear prediction coefficient.

In some embodiments, the at least one instruction, when executed by a processor of the encoding device, causes the encoding device to perform: integrating at least one of the sampling rate, number of sound channels, bandwidth, bit rate, voice activity detection information, entropy encoding information, noise shaping gain, or linear prediction coefficient of processed history data frame; and determining the first state information based on the at least one of the sampling rate, number of sound channels, bandwidth, bit rate, voice activity detection information, entropy encoding information, noise shaping gain, or linear prediction coefficient as integrated.

In some embodiments, the at least one instruction, when executed by the processor of the encoding device, causes the encoding device to perform: acquiring a second target data frame corresponding to an adjacent data frame, wherein the adjacent data frame is a data frame adjacent to the current data frame in the live-streaming data; acquiring a long-term prediction parameter, wherein the long-term prediction parameter is less than a parameter threshold; and sending the first target data frame and the second target data frame to a decoding device based on the long-term prediction parameter, such that the decoding device decodes the first target data frame and the second target data frame based on the long-term prediction parameter.

In some embodiments, the at least one instruction, when executed by the processor of the encoding device, causes the encoding device to perform: acquiring a packet loss rate of a history period; and acquiring the long-term prediction parameter in response to the packet loss rate being higher than a preset packet loss rate threshold.

In some embodiments, the at least one instruction, when executed by the processor of the encoding device, causes the encoding device to perform: integrating the first encoded data frame and the second encoded data frame, and determining the first target data frame based on an integrated result.

In some embodiments, a computer program product is further provided, wherein the program product includes a computer program stored in a storage medium, and the computer program, when read and run by at least one processor of an encoding device, causes the encoding device to perform: acquiring first state information associated with a current data frame, wherein the current data frame is a data frame in the live-streaming data; generating backup state information by backing up the first state information; generating a first encoded data frame by encoding the current data frame based on a first bit rate and the first state information, wherein the first state information is updated upon completion of the encoding; generating reset state information by resetting the updated first state information based on the backup state information, wherein the reset state information is consistent with the first state information prior to the updating; generating a second encoded data frame by encoding the current data frame based on a second bit rate and the reset state information, wherein the second bit rate is different from the first bit rate; and generating a first target data frame corresponding to the current data frame based on the first encoded data frame and the second encoded data frame.

In some embodiments, the current data frame includes an audio frame; the first state information includes at least one of a sampling rate, a number of sound channels, a bandwidth, a bit rate, voice activity detection information, entropy encoding information, a noise shaping gain, or a linear prediction coefficient.

In some embodiments, the computer program, when read and run by at least one processor of an encoding device, causes the encoding device to perform: acquiring a second target data frame corresponding to an adjacent data frame, wherein the adjacent data frame is a data frame adjacent to the current data frame in the live-streaming data; acquiring a long-term prediction parameter, wherein the long-term prediction parameter is less than a parameter threshold; and sending, the first target data frame and the second target data frame to a decoding device based on the long-term prediction parameter, such that the decoding device decodes the first target data frame and the second target data frame based on the long-term prediction parameter.

In some embodiments, the computer program, when read and run by at least one processor of an encoding device, causes the encoding device to perform: acquiring a packet loss rate of a history period; and acquiring the long-term prediction parameter in response to the packet loss rate being higher than a preset packet loss rate threshold.

In some embodiments, the computer program, when read and run by at least one processor of an encoding device, causes the encoding device to perform: integrating the first encoded data frame and the second encoded data frame, and determining the first target data frame based on an integrated result.

What is claimed is:

1. A method for encoding live-streaming data, applicable to an encoding device, the method comprising:
   acquiring first state information associated with a current data frame, wherein the current data frame is a data frame in the live-streaming data;
   generating backup state information by backing up the first state information;
   generating a first encoded data frame by encoding the current data frame based on a first bit rate and the first state information, wherein the first state information is updated upon completion of the encoding;
   generating reset state information by resetting the updated first state information based on the backup state information, wherein the reset state information is consistent with the first state information prior to the updating;
   generating a second encoded data frame by encoding the current data frame based on a second bit rate and the reset state information, wherein the second bit rate is different from the first bit rate; and
   generating a first target data frame corresponding to the current data frame based on the first encoded data frame and the second encoded data frame.

2. The method according to claim 1, wherein the current data frame comprises an audio frame; and the first state information comprises:
   at least one of a sampling rate, a number of sound channels, a bandwidth, a bit rate, voice activity detection information, entropy encoding information, a noise shaping gain, or a linear prediction coefficient.

3. The method according to claim 2, wherein said acquiring the first state information associated with the current data frame comprises:
   integrating at least one of the sampling rate, number of sound channels, bandwidth, bit rate, voice activity detection information, entropy encoding information, noise shaping gain, or linear prediction coefficient of processed history data frame; and
   determining the first state information based on the at least one of the sampling rate, number of sound channels, bandwidth, bit rate, voice activity detection information, entropy encoding information, noise shaping gain, or linear prediction coefficient as integrated.

4. The method according to claim 1, further comprising:
   acquiring a second target data frame corresponding to an adjacent data frame, wherein the adjacent data frame is a data frame adjacent to the current data frame in the live-streaming data;
   acquiring a long-term prediction parameter, wherein the long-term prediction parameter is less than a parameter threshold; and
   sending the first target data frame and the second target data frame to a decoding device based on the long-term prediction parameter, such that the decoding device decodes the first target data frame and the second target data frame based on the long-term prediction parameter.

5. The method according to claim 4, wherein said acquiring the long-term prediction parameter comprises:
   acquiring a packet loss rate of a history period; and
   acquiring the long-term prediction parameter in response to the packet loss rate being higher than a preset packet loss rate threshold.

6. The method according to claim 1, wherein said generating the first target data frame corresponding to the current data frame based on the first encoded data frame and the second encoded data frame comprises:
integrating the first encoded data frame and the second encoded data frame, and determining the first target data frame based on an integrated result.

7. A system for transferring live-streaming data, comprising: an encoding device and a decoding device; wherein
the encoding device is configured to generate a fidelity encoded data frame by encoding a current data frame based on a fidelity bit rate and first state information associated with the current data frame; acquire a compressed encoded data frame corresponding to history data frame; combine the compressed encoded data frame and the fidelity encoding data frame into a data composite packet; and send the data composite packet to the decoding device, wherein the current data frame is a data frame in the live-streaming data, the compressed encoded data frame is acquired by encoding the history data frame based on compression bit rate and second state information associated with the history data frame, and the history data frame is a data frame corresponding to a history moment before the current data frame; and
the decoding device is configured to generate a compressed data frame and a first fidelity data frame by decoding the data composite packet; generate corresponding live-streaming data based on the compressed data frame and the first fidelity data frame by replacing, in response to receiving loss information of a second fidelity data frame, the second fidelity data frame with the compressed data frame, wherein the second fidelity data frame is a data frame generated based on the history data frame and the fidelity bit rate.

8. The system according to claim 7, wherein the decoding device is further configured to generate the first fidelity data frame by decoding the data composite packet in a fidelity bit rate state; and generate the compressed data frame by decoding the data composite packet in a compression bit rate state.

9. An encoding device, comprising:
a processor; and
a memory configured to store at least one instruction executable by the processor;
wherein the processor, when executing the at least one instruction, is caused to perform:
acquiring first state information associated with a current data frame, wherein the current data frame is a data frame in live-streaming data;
generating backup state information by backing up the first state information;
generating a first encoded data frame by encoding the current data frame based on a first bit rate and the first state information, wherein the first state information is updated upon completion of the encoding;
generating reset state information by resetting the updated first state information based on the backup state information, wherein the reset state information is consistent with the first state information prior to the updating;
generating a second encoded data frame by encoding the current data frame based on a second bit rate and the reset state information, wherein the second bit rate is different from the first bit rate; and
generating a first target data frame corresponding to the current data frame based on the first encoded data frame and the second encoded data frame.

10. The encoding device according to claim 9, wherein the current data frame comprises an audio frame; and the first state information comprises:
at least one of a sampling rate, a number of sound channels, a bandwidth, a bit rate, voice activity detection information, entropy encoding information, a noise shaping gain, or a linear prediction coefficient.

11. The encoding device according to claim 9, wherein the processor, when executing the at least one instruction, is further caused to perform:
integrating at least one of a sampling rate, number of sound channels, bandwidth, bit rate, voice activity detection information, entropy encoding information, noise shaping gain, or linear prediction coefficient of processed history data frame; and
determining the first state information based on the at least one of the slumping rate, number of sound channels, bandwidth, bit rate, voice activity detection information, entropy encoding information, noise shaping gain, or linear prediction coefficient as integrated.

12. The encoding device according to claim 9, wherein the processor, when executing the at least one instruction, is further caused to perform:
acquiring a second target data frame corresponding to an adjacent data frame, wherein the adjacent data frame is a data frame adjacent to the current data frame in the live-streaming data;
acquiring a long-term prediction parameter, wherein the long-term prediction parameter is less than a parameter threshold; and
sending the first target data frame and the second target data frame to a decoding device based on the long-term prediction parameter, such that the decoding device decodes the first target data frame and the second target data frame based on the long-term prediction parameter.

13. The encoding device according to claim 12, wherein the processor, when executing the at least one instruction, is further caused to perform:
acquiring a packet loss rate of a history period; and
acquiring the long-term prediction parameter in response to the packet loss rate being higher than a preset packet loss rate threshold.

14. The encoding device according to claim 9, wherein the processor, when executing the at least one instruction, is further caused to perform:
integrating the first encoded data frame and the second encoded data frame, and determining the first target data frame based on an integrated result.

* * * * *